United States Patent [19]

Petoud

[11] Patent Number: 5,351,975
[45] Date of Patent: Oct. 4, 1994

[54] SLIDING APPARATUS FOR SNOW SPORTS

[76] Inventor: Frank Petoud, Champs Gonin, St. Cergues 74140, France

[21] Appl. No.: 927,403

[22] PCT Filed: Mar. 15, 1991

[86] PCT No.: PCT/FR91/00208
§ 371 Date: Nov. 19, 1992
§ 102(e) Date: Nov. 19, 1992

[87] PCT Pub. No.: WO91/14608
PCT Pub. Date: Oct. 3, 1991

[30] Foreign Application Priority Data

Mar. 21, 1990 [FR] France ................... 90 03622

[51] Int. Cl.$^5$ ............................ B62B 13/04
[52] U.S. Cl. .................... 280/14.3; 280/16; 280/21.1; 280/22.1
[58] Field of Search ............ 280/11.12, 12.1, 845, 280/16, 21.1, 22, 22.1, 23.1, 25

[56] References Cited

U.S. PATENT DOCUMENTS

| | | | |
|---|---|---|---|
| 2,513,199 | 6/1950 | Ohlhaver | 280/16 |
| 3,717,359 | 2/1973 | Peronnon et al. | 280/16 |
| 3,730,546 | 5/1973 | Evequoz | 280/16 |
| 3,870,330 | 3/1975 | Hatano et al. | 280/16 |
| 4,097,055 | 6/1978 | Laycraft | 280/16 |
| 4,773,659 | 9/1988 | Rygiel | 280/16 |

FOREIGN PATENT DOCUMENTS 1068751 12/1979 Canada.

Primary Examiner—Richard M. Camby
Attorney, Agent, or Firm—Skjerven, Morrill, MacPherson, Franklin & Friel

[57] ABSTRACT

A device for snow sports is characterized in that the rear of a forward steering skid (2) is rounded, while a widest part of the bearing skid (1) is about ⅔ as wide as the widest part of the steering skid and is its length is approximately twice that of the steering skid (2). Also, a tip of the bearing skid is turned up higher than that of the steering skid.

10 Claims, 2 Drawing Sheets

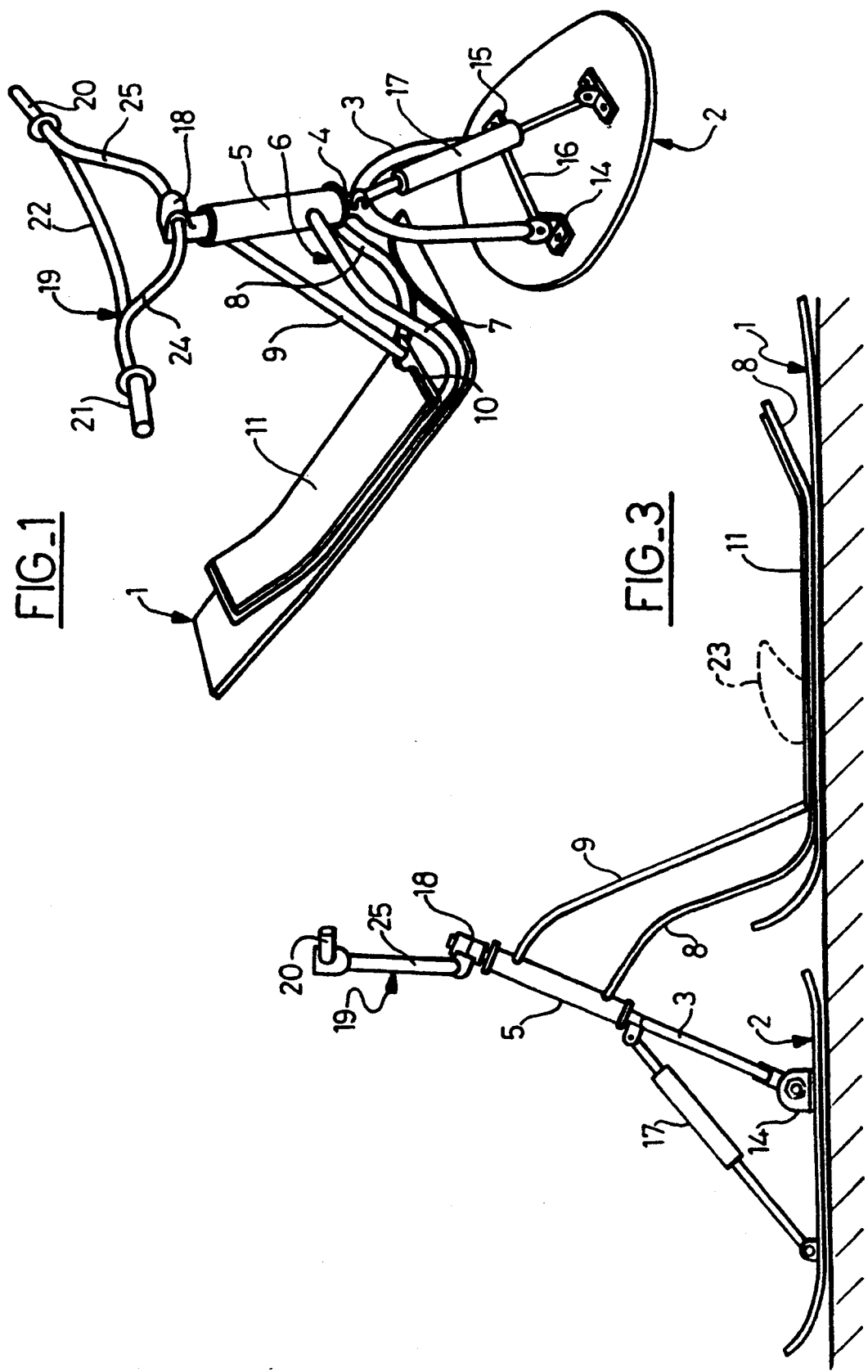

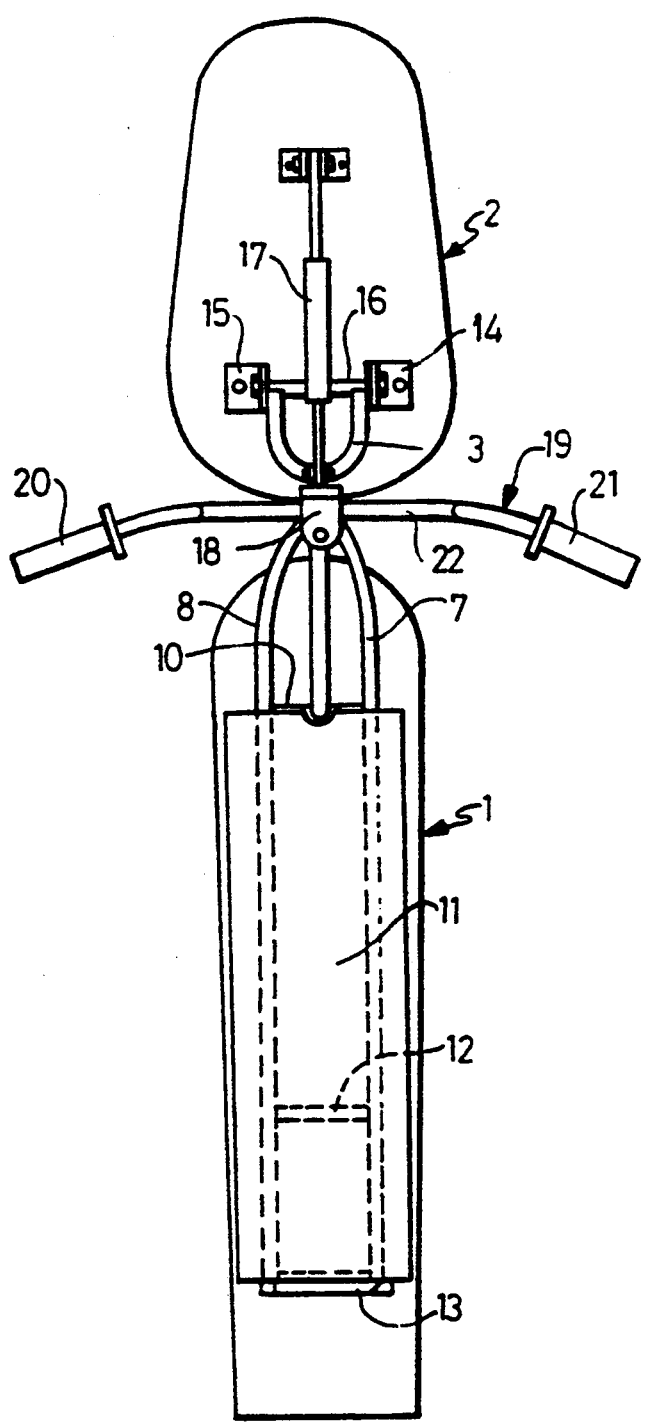
FIG_2

5,351,975

SLIDING APPARATUS FOR SNOW SPORTS

FIELD OF THE INVENTION

The present invention is directed at the industry of sporting articles, in particular artifacts used for sliding on snow.

BACKGROUND OF THE INVENTION

Amongst the numerous articles derived from skiing and sleds, a type of scooter has been proposed where the wheels have been substituted by runners. Such an apparatus, highly studied, is described in the patent of the U.S. Pat. No. 4,773,659. If such an apparatus allows for sliding on compact, somewhat icy snow, the apparatus is practically useless on soft powder snow because the apparatus sinks to the point where the front runner can no longer be efficiently directed. Furthermore, such an apparatus is not conveniently balanced to allow for jumps and other acrobatic activity sought after by many sports people.

SUMMARY OF THE INVENTION

An in depth study, backed up by practical trials, has determined that these faults could be rectified by a particular configuration of the front steering runner that avoids a lateral slip in curves that throws the apparatus off balance, and attains by an optimum rapport of shape and dimensions between the steering runner and the principal runner, as well as an appropriate positioning of the steering connection and handlebar.

Thus, the invention's end is to be a sliding apparatus rendering functional the results of this research and allowing sporting evolution and acrobatics in excellent conditions of stability and maneuverability even in soft powder snow.

The invention is therefore a sliding apparatus for snow sports consisting of a rear supporting runner offering support for the user's feet, united to a rigid frame and pivoting arm, controllable manually by a handlebar and linked to a front steering runner as a prolongation of the supporting runner, by a rigid or flexible link, following a horizontal axis perpendicular to the general axis of the steering runner. The foremost design of the steering runner is characteristically rounded. The widest part of the supporting runner is around ⅔ of that of the steering runner and its length is approximately double that of that of the steering runner. The nose of the supporting runner is raised higher than that of the steering runner. A good negotiation of moguls and other faults in the terrain is obtained when the steering runner is linked to the pivoting arm at about a ¼ of the way up its length from the base. A good, balanced maneuverability of the apparatus is ensured when the axis of the pivoting arm is inclined towards the rear at an angle of about 65 degrees. The grips of the handlebar extending from the pivoting arm are positioned transversally from the rest of the parts above the connection separating the steering runner from the supporting runner. The handlebar is extended forward on an adjustable coupling capping the extremity of the shaft, and the height is adjustable with a sliding movement on the pivoting arm. The lateral arms of the handlebar are approximately perpendicular to the ground.

According to the most advantageous construction, the frame is fixed on the upper face of the supporting runner between around 1/5 of the length of the runner from the nose and a ⅓ of the length from the rear, and it extends to around 1/5 of the length of the runner from the rear. The frame is raised up from the upper surface of the runner at an angle of approximately 20 degrees, and a resting foot plate covers the part of the frame attached to the supporting runner as well as the raised extension.

To ensure a more comfortable ride, especially on rough terrain, the link of the pivoting arm to the steering runner is an articulation whose rocking action around a horizontal axis perpendicular to the axis of the runner is controlled by breaking means. On the other hand, for acrobatics or high speeds this link is rigid. These breaking means are better constituted by a shock absorber linking a point of the pivoting arm above the articulation to a point on the steering runner situated at about ¼ of its length from the nose. Sliding on soft snow or powder at high speeds can be facilitated when the underside of the steering runner in horizontal position is higher than that of the supporting runner in relation to the surface of the ground.

The resistance to lateral force is improved when the link of the steering runner at the extremity of the pivoting arm is done with two stirrups symmetrically spread out from the general axis of the runner and separated by a distance equal to around ½ of the widest part of the runner, holding on a horizontal axis the arms of a fork emanating from the pivoting arm.

Due to the aforementioned choice of characteristics, the trajectory of the lateral rails of the supporting runner coincides sensitively with that of the lateral rails of the steering runner in meandering turns. A greater understanding of the invention can be obtained from the examination and detailed description of the annexed drawings which represent the make-up of the invention chosen simply as an example amongst numerous forms of execution, adaptation and variations of the invention accessible to a notified technician.

BRIEF DESCRIPTION OF THE DRAWINGS

Upon this design FIG. 1 is a schematic view, in perspective, of an apparatus for snow sports according to the invention.

FIG. 2 is a schematic view from above of the apparatus in FIG. 1, and FIG. 3 is a schematic view of the profile of this same apparatus.

On these figures the corresponding elements are indicated by the same numerical references.

The respective dimensions and proportions of these elements may not be respected attempting to render the drawings more legible.

DETAILED DESCRIPTION

The apparatus for snow sports according to the invention presented in FIGS. 1 to 3, of an overall length of around 1.50 meters is essentially composed of a supporting runner (1), linked to a steering runner (2) by a terminal fork (3) from a pivoting arm (4). This arm pivots freely in a sheath (5), which is inclined at 65 degrees approximately in relation to the ground, being part of a metal tube frame (6) made up of two diverging curved stringers (7,8) emanating from the sheath's base (5), and attached parallelly from their underside to the upper surface of the supporting runner (1) following two rectilinear parts between around 1/5 of the length from the front and ⅓ from the rear of the runner (1), which extends to a raised end at approximately 20 degrees in relation to the ground. The end of the supporting strut (9) inclined at around 70 degrees in relation to the ground, emanating from the upper part of sheath (5), is attached to a cross brace (10) linking two stringers (7,8) at the point of their jointure with the supporting runner (1). Foot rest (11), with a non-slip surface, is attached from its underside to the upper surface of the final rectilinear parts of stringers (7,8). It can accommodate the feet, one beside the other or one behind the other. Cross braces (12,13), linking stringers (7,8) ensure a good rigidity to the whole unit. Supporting runner (1), approximately 95 cm in length, is curved upwards at its nose from around 1/5 of its length from the nose, to 10 cm in height from the ground, in the same way its rear part is raised beginning from a ⅓ from the rear of the runner to around 1 cm above the ground. The raised nose of the supporting runner (1) is rounded beginning from around a ⅓ of the length from the front of the runner where its width is a maximum of around 23 cm, diminishing gradually to around 18 cm at the end of the runner in the shape of a trapezium, its narrowest part facing backwards. Steering runner (2) of around 50 cm in length is of a trapezium shape, its narrowest part facing forward, diminishing from a point around ¼ of its length from the rear, where the width is a maximum of around 30 cm, its nose is rounded from one side to the other from the central, parallel or (slightly inclined) section of the runner, following arcs of around 8 cm in radius.

The front part of steering runner (2), is raised evenly from around the ½ of its length towards the front to around 5 cm above the ground at the nose. In the same way its rear is raised evenly to around 1 cm above the ground at the rear. Steering runner (2) is articulated at around ¼ of its length from its back end, at the ends of fork (3) by two mounting brackets (14,15), parallel, separated by a distance of around 15 cm, and crossed by an axle (16) parallel to the ground, perpendicular to central axis of the runner (2). A pneumatic shock absorber (17) links the base of fork (3) to around ¼ of the length of the runner from the front, by free articulation. This design assures an excellent stability of steering runner (2) in all types of maneuvers. On the other hand, this pneumatic shock absorber (17) can be replaced by any other shock absorption system, particularly by friction washers breaking the pivot at the extremities of fork (3) on mounting brackets (14,15), on axle (16), or furthermore by a simple rigid reinforcing rod. The underside of steering runner (2) is advantageously maintained in horizontal position by the mounting brackets (14,15) and the shock absorber (17) at a slightly higher level of around 0.5 cm more than that of the underside of supporting runner (1).

The plumb-line of the nose of supporting runner (1) is spaced around 5 cm from the rear of steering runner (2).

The upper extremity of pivoting arm (4) is extended by a shaft adjustable in height by a slipping action in the arm, capped by an adjustable coupling (18) projecting forward holding the center of the handlebar (19) of around 70 cm in length with two hand grips (20,21) reinforced by a cross brace (22). The plumb-line of hand grips is situated vertically between the nose of the supporting runner (1) and end of the steering runner (2) when the axis of steering runner (2) is directly in line with that of supporting runner (1). The arms (24,25) of the handlebar are situated in a perpendicular position to the ground.

The runners, supporting (1) and steering (2), are made up of the classical ski construction materials generally laminated in wood, metal, fibber-glass, carbon fiber bound together by synthetic resin. Their bottom lateral edges are reinforced by sharp metal rails for traction on more or less icy snow, particularly in winding turns. Preferably, the runners are thicker at the tail than at the nose.

When steering runner (2) is turned with the handlebar (19) while in motion the track of the supporting runner (1) comes to fall in that of the steering runner (2) without any skidding of the tail of the steering runner because of its rounded shape.

This way excellent conditions of stability and maneuverability are obtained from the apparatus for snow sports object of the invention, notably over soft powder snow as well as for jumps and other acrobatic maneuvers.

The raised back end of the foot support (11) offers the user a support for elevating the nose of the apparatus during certain maneuvers.

A binding foot strap for the user's shoes can be installed on foot rest (11), as shown in dotted lines (23) on FIG. 3, notably in order to permit the use of mechanical lift means in the winter sports resorts. This binding can be advantageously dismantled to allow removal for acrobatic maneuvers where it can be a hindrance if not a danger.

The diverse dimensions of the elements outlined in the preceding examples are generally for adults, they can however be modified proportionally for a better adaptation notably for children.

For acrobatic maneuvers the shock absorber is blocked or replaced with a rigid rod, or even omit the rod welding the stirrups to the extremities of the fork arms. And moving this point to around a ½ of the length of the runner for reinforcement at the same time preserving sufficient elasticity and flexibility to absorb the sudden inequalities in terrain without snapping.

I claim:

1. A sliding for snow sports comprising:
   a rigid frame (6);
   one supporting runner (1) affixed to said rigid frame, and having a tip and a tail;
   a foot support 11 mounted on said rigid frame over said supporting runner;
   pivoting arm (4) rotatably mounted to said rigid frame wherein an axis of the pivoting arm (4) is inclined towards the rear at an angle of about 65 degrees;
   a cross piece (18) adjustable in height by a sliding action within the pivoting arm (4);
   a handlebars (19) mounted in said cross piece (18) so that said handlebars is shifted forward of a top of said pivoting arm (4), and having lateral arms (24,25) approximately perpendicular to the ground and;
   a front steering runner (2) in line with the supporting runner and linked to said pivoting arm by a link in the general axis of the steering runner wherein
   a tail of the steering runner is rounded;
   a widest part of the supporting runner (1) is about ⅔ of a widest part of the steering runner;
   a length of the supporting runner being about double a length of the steering runner;
   the nose of the supporting runner being higher than a nose of the steering runner.

2. The sliding apparatus as in claim 1 further characterized in that the frame (6) is linked to an upper face of the supporting runner (1) between about a 1/5 of the supporting runner's length from the nose and a ⅓ of the supporting runner's length from the tail, and the frame extends to about a 1/5 of the supporting runner's length from the tail, diverging from the upper face of the supporting runner following an angle of around 20 degrees; and the foot support (11) covers the part of the frame fixed to the runner, as well as its elevated extension.

3. The sliding apparatus according to claims 1 or 2 further characterized in that a lower part of and underside of the steering runner (2) in a horizontal position is higher, in relation to the ground than a lowest part of the supporting runner (1).

4. The sliding apparatus as in claim 3 further characterized in that trajectories of lateral rails of the supporting runner (1) coincide with trajectories of lateral rails of the steering runner (2) in winding turns.

5. The sliding apparatus as in claim 4 further characterized in that the tails of the supporting and steering runners are curved upwards.

6. A sliding apparatus for snow sports comprising:
   a steering runner having (i) a first end and a second end where the distance between said first and second ends defines a length in a first direction; and (ii) a maximum width in a second direction where said first direction is perpendicular to said second direction;
      wherein said first end is a nose of said steering runner and said nose has a height in a third direction where said third direction is perpendicular to a plane defined by said first and second directions; and
      said second end is a tail of said steering runner and further wherein said tail is rounded;
   a single supporting runner having (i) a first end and a second end where the distance between said first and second ends defines a length in a first direction; and (ii) a maximum width in a second direction where said first direction is perpendicular to said second direction
      wherein said first end is a nose of said supporting runner and said nose has a height in said third direction that is greater than said height of said nose of said steering runner;
      said second end is a tail of said supporting runner and further wherein
         the maximum width of said supporting runner is less than the maximum width of the steering runner; and
         the length of said supporting runner is greater than the length of said steering runner;
   a frame fixedly attached to said support runner;
   a foot support attached to said frame over said support runner; and
   a steering assembly attached to said steering runner and pivotally attached to said frame.

7. A sliding apparatus for snow sports as in claim 6 wherein the maximum width of said supporting runner is about ⅔ of the maximum width of the steering runner.

8. A sliding apparatus for snow sports as in claim 6 wherein the length of said supporting runner is about twice the length of said steering runner.

9. A sliding apparatus for snow sports as in claim 6 wherein:
   the frame is linked to an upper face of the supporting runner starting at about 1/5 of the supporting runner's length from the nose and extending to about ⅓ of the supporting runner's length from the tail;
   the frame extends to about 1/5 of the supporting runner's length from the tail; and
   the frame diverges from the upper face of the supporting runner from the about ⅓ of the supporting runner's length from the tail to the about 1/5 of the supporting runner's length from the tail at an angle of about 20 degrees 10. A sliding apparatus for snow sports as in claim 9 wherein the foot support covers the part of the frame linked to the supporting runner and the portion of the frame diverging from the upper face of the supporting runner.

* * * * *